Figure 1:
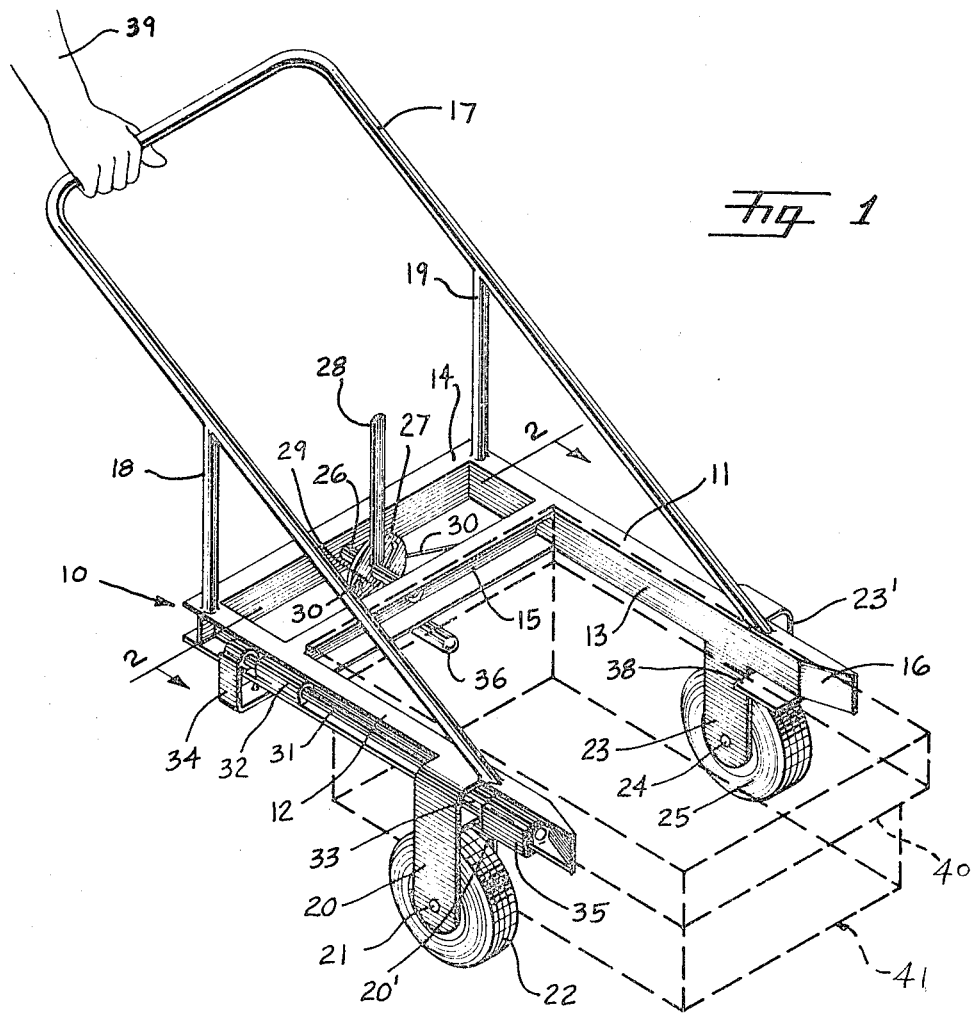

United States Patent

[11] 3,547,288

| [72] | Inventors | Amos R. Butler<br>Highway 242, P.O. Box 276;<br>Thomas L. Sutton, North Clinton St., P.O.<br>Box 474, Roseboro, N.C. 27382 |
|---|---|---|
| [21] | Appl. No. | 761,145 |
| [22] | Filed | Sept. 20, 1968 |
| [45] | Patented | Dec. 15, 1970 |

[54] MOVING CART
2 Claims, 2 Drawing Figs.

[52] U.S. Cl. .................................................. 214/372,
214/390; 254/8
[51] Int. Cl. ..................................................... B60p 1/64
[50] Field of Search............................................ 214/370,
372, 373, 390, 512, 515, 377, 379; 254/8—10

[56] References Cited
UNITED STATES PATENTS

| 1,239,771 | 9/1917 | Collis ......................... | 214/390 |
| 2,822,944 | 2/1958 | Blomgren..................... | 214/390 |
| 3,292,801 | 12/1966 | Walz et al. ................... | 214/390 |
| 3,378,155 | 4/1968 | Steiner ........................ | 214/390 |

FOREIGN PATENTS

| 724,135 | 2/1955 | Great Britain................ | 214/390 |

*Primary Examiner*—Albert J. Makay
*Attorney*—John G. Mills, III

ABSTRACT: In abstract, a preferred embodiment of this invention is a frame-type cart having pivoted flanges for engaging the bottom of a series of stacked containers so that the entire stack may be lifted clear of the ground or floor and moved with relative ease by one person.

PATENTED DEC 15 1970 3,547,288

AMOS R. BUTLER
THOMAS L. SUTTON
INVENTORS.

BY John G. Mille

ATTORNEY.

MOVING CART

DESCRIPTION

This invention relates to wheeled moving devices and more particularly to moving carts for transferring a multiplicity of stacked units from one place to another.

In the past, much experimentation has been done in an effort to reduce the time and labor involved in raising large numbers of fowl and animals such as chickens, turkeys, minks, chinchillas and the like. As these experiments prove the feasibility of new methods of raising the various species of fowls and animals, large commercial operations developed.

In recent years, fowls such as chickens and animals such as mink have been raised without their feet touching the ground from birth to sale. Today in the poultry industry, chicks are placed in a brooder house for a period of approximately 6 weeks, when they are transferred to wire cages within a pullet house to complete their growth. From the pullet cage house, they are either transferred to coops for delivery to poultry processing plants or to laying cage houses for egg production. Since the feeding, watering and the atmospheric conditions are all carefully controlled and automated, a minimum of effort and labor is required for the entire operation.

One of the burdensome areas that remain is the transferring of the birds from the brooder house to the pullet cage house and out of the pullet cage house to either the laying house or to coops for transfer to the processor. Up to now, these transfers have been accomplished by attendants either grabbing the legs of several chickens in each hand and walking them from one building to another or stacking of a multiplicity of coops on a flat bed dolly, filling the coops with chickens and then transferring such coops to the new area. This latter method is burdensome in that it requires two mean to perform the transfer task. When it is remembered that these high-density houses are often 250 feet long with several yards between buildings (a single brooder house operation being capable of an annual capacity of around 85,000 birds, it can easily be seen that hand transferring is impractical and two men handling an average of approximately four coops per trip is expensive.

The present invention has been developed after much research and study into the above mentioned problems and is designed to eliminate at least 50 percent of the labor now required to affect the transfer of any given large number of birds from one brooder or cage house to another. To accomplish this, a generally U-shaped part has been developed which surrounds a stack of coops with an efficient mechanical mechanism gripping two sides and the end of the lower unit to allow the entire stack to be raised off of the surface from which it is sitting and moved. Due to the simplicity and yet efficiency of the device of the present invention, only one man is required to lift and move as many or more transfer coops as two men could using the dolly method.

It is an object, therefore, of the present invention to provide a container-engaging and transporting device requiring only a single person for operation.

Another object of the present invention is to provide the strong, yet simply constructed cart for picking up and moving at least one container type unit.

A further object of the present invention is to provide a container moving unit which grips and releases a cargo to be moved through the manipulation of a single lever-type activating means.

Another object of the present invention is to provide a moving device which picks up and lowers it's cargo through a tipping action, one end at a time.

Other objects and advantages of the present invention will become apparent and obvious from a study of the following description and the accompanying drawings which are merely illustrative of the present invention.

Figure 2:
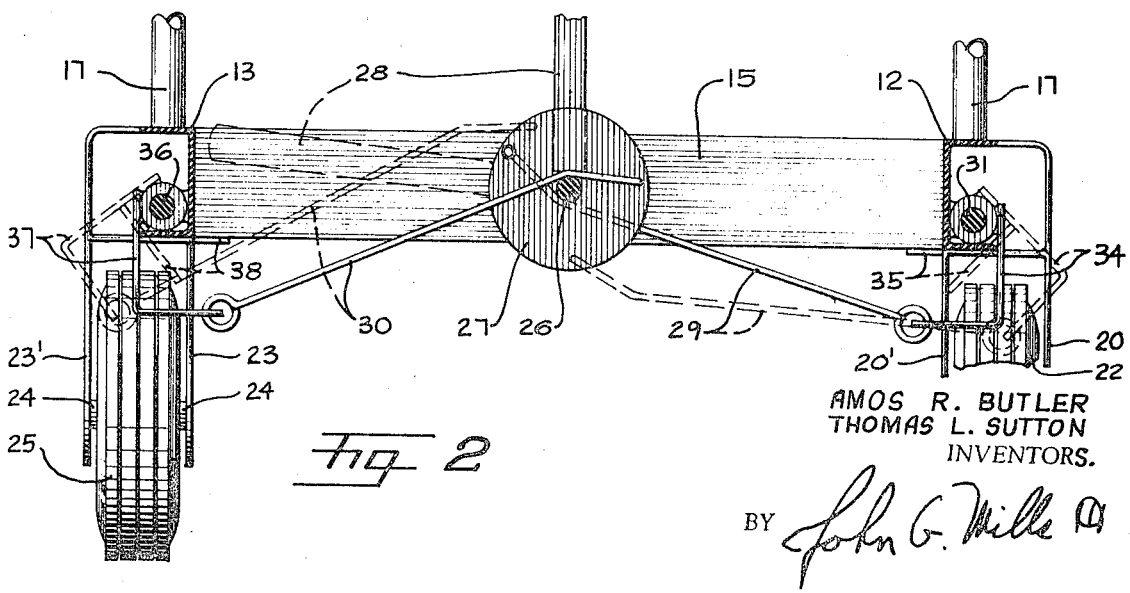

In the drawings:

FIG. 1 is a perspective of the moving cart of the present invention showing the engaging mechanism; and FIG. 2 is a sectional view of the cart taken through lines 2-2 of FIG. 1.

With further reference to the drawings, a moving cart indicated generally at 10 has a generally U-shaped main frame 11 composed of frame arms 12 and 13 with an end portion 14. Fixedly attached to and disposed between frame arms 12 and 13, generally parallel to end portion 14, is intermediate member 15. The outer ends of frame arms 12 and 13 are beveled outwardly to form guiding surfaces when the cart is being placed in position for pickup.

A generally U-shaped handle 17 has its ends fixedly attached to the main frame near the beveled end portions or guide surfaces 16.

Extending between the juncture of frame arm 12 and end portion 14 is reenforcing member 18. Similarly extending between the juncture of frame arm 13 and end portion 14 is reenforcing member 19.

A pair of wheel supporting flanges 20 and 20' are fixedly secured to frame arm 12. Disposed between these two flanges adjacent their end portions is an axle 21 upon which wheel 22 is rotatively mounted. Similarly disposed from frame arm 13 are flanges 23 and 23' which carry axle 24 upon which is rotatively mounted wheel 25.

Pivot pin 26 is rotatively mounted, attached to, and disposed between end portion 14 and intermediate member 15. A lever plate 27 is fixedly secured at its center to pivot pin 26 in a plane perpendicular to the axis of such pin.

An operating handle 28 is fixedly secured to plate 27 and extends outwardly therefrom.

A pair of nondiagonally aligned openings are provided in plate 27 and are adapted to operatively receive control arms 29 and 30.

Parallely-disposed adjacent to and extending from a point near one end of frame arm 12 to a point near its other end is pivot arm 31. This arm is rotatively supported on such frame by bushing mountings 32 and 33.

An L-shaped operating arm 34 is fixedly secured to the ends of pivot arm 31 adjacent end portion 14. The outer end of this arm is disposed toward lever plate 27 and is adapted to operatively engage the end of control arm 29 opposite said plate 27.

Fixedly secured to the end of pivot arm 31 opposite operating arm 34 is a generally L-shaped support flange 35.

Extending outwardly into the open area formed between arms 12 and 13 is support pin 36 which is fixedly secured to intermediate member 15.

Parallely-disposed adjacent frame arm 13 is pivot arm 37 which has fixedly secured to one end an L-shaped mounting arm 37 in similar location to arm 34. This last mentioned pivot arm is mounted similar to arm 31 and carries support flange 38 which is similarly supported to flange 35.

OPERATION

In actual use of the cart of the present invention, a multiplicity of coops of standard configuration are piled on the floor at a convenient location within the house where the chickens are to be transferred from. These coops are then filled to capacity. A single worker then wheels the cart of the present invention to a point adjacent the bottom coop indicated generally at 41 so that the cart actually fits around three sides of such coop with frame arms 12 and 13 on opposite sides thereof with intermediate frame 15 adjacent one end.

As handle 17 is slightly lowered, pin 36 will slip under the standard upper frame 40 of the lower coop. The handle 17 is then raised by the worker 39 to lift the end of the lower coop off of the floor with the wheels 22 and 25 acting as pivots until the lower edge of frame 40 is parallel to, or above, the bottom edge of frame 11 (as oriented in the FIGS.). The operating handle 28 is now moved to the position shown in the drawings thus through the linkages of lever plate 27, control arms 29 and 30, and pivot arms 31 and 36 cause engaging arms or flanges 35 and 38 to engage the bottom of the coop frame 40.

As handle 17 is lowered, the end of the bottom coop opposite the end adjacent intermediate frame 15 is lifted clear of the floor. Thus the entire stack of coops is now clear of the floor or ground upon which it was sitting and the worker 39, balancing the load with handle 17, simply moves the cart with its load to wherever desired.

Whenever the load of coops or containers are transported to their desired unloaded position, handle 17 is raised by the worker 39 to gently place one end of coop 41 on the ground. The operating handle 28 is then moved to the dotted line position as seen in FIG. 2 which moves flanges 35 and 38 to their dotted positions through the linkages hereinabove described for the engagement of such flanges with the coop. Thus it can be seen that the coop is disengaged from such flanges. To complete release of the cargo carried by the cart, all that is now necessary is for handle 17 to be gently lowered until the other end of coop 41 is resting on the floor, ground or other surface. The cart may then be moved toward the worker thus disengaging pin 36 and removing such cart from around the cargo that has been transported.

From the above, it is obvious that the present invention has the advantage of providing a device which is simple in construction and operation and yet is efficient in use and requires a minimum of labor for operation. The present invention also has the advantage of being light in weight and yet sturdy in construction so that it is capable of moving larger loads with less effort than has hereto fore been possible.

The terms "upper", "lower", "bottom" and so forth have been used herein merely for the convenience of the foregoing specification to describe the moving cart and its parts as oriented in the drawings. It is to be understood, however, that these terms are in no way limiting to the invention since the cart may obviously be disposed in many different positions when in actual use.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

We claim:

1. In a cart for transporting at least one container having a multiplicity of sides and an outwardly projecting frame along at least a portion of at least three of such sides, the improvement comprising: a generally U-shaped cart frame having two outer ends and a central portion for surrounding a portion of three sides of said container; pin means secured to said central portion of the cart frame for liftingly engaging said container frame at one point; a pair of flange means pivotably attached to said cart frame adjacent each of its outer ends for liftingly engaging said container frame disposed juxtaposed to said flanges; a lever plate operatively mounted on said cart frame remote from said pair of flange means; linkage means operatively connecting said lever plate means with said flange means whereby said flanges may be pivoted for engagement and disengagement with said container frame; wheel support means depending from and fixedly secured to said cart frame; and wheel means rotatively mounted on said wheel support means whereby said container may be transported.

2. The cart of claim 1 wherein a handle is fixedly secured to said lever plate to aid in the operation thereof.